United States Patent [19]
Bühler et al.

[11] Patent Number: 5,902,356
[45] Date of Patent: May 11, 1999

[54] TEXTILE DYE PREPARATIONS

[75] Inventors: Ulrich Bühler, Alzenau; Hubert Kruse, Königstein; Rainer Az, Wiesbaden, all of Germany

[73] Assignee: DyStar Japan Ltd., Osaka, Japan

[21] Appl. No.: 08/887,618

[22] Filed: Jul. 3, 1997

Related U.S. Application Data

[63] Continuation of application No. 08/653,011, May 24, 1996, abandoned.

[30] Foreign Application Priority Data

May 26, 1995 [DE] Germany ............................ 19519356

[51] Int. Cl.$^6$ ................................. D06P 1/46; D06P 3/85; D06P 3/854
[52] U.S. Cl. .......................... 8/524; 8/532; 8/533; 8/557; 8/576; 8/587; 8/588; 8/594; 8/921; 8/922; 8/924; 8/580
[58] Field of Search ................................ 8/524, 557, 576, 8/532, 533, 921, 922, 924, 587, 594, 588, 580

[56] References Cited

U.S. PATENT DOCUMENTS 4,597,906  7/1986  Uhrig et al. .
5,008,442  4/1991  Uhrig et al. .
5,420,315  5/1995  Uhrig et al. ............................ 554/96

FOREIGN PATENT DOCUMENTS 0 032 188  7/1981  European Pat. Off. .
 582928  2/1994  European Pat. Off. .

*Primary Examiner*—Margaret Einsmann

[57] ABSTRACT

The present invention relates to liquid or pulverulent textile dye preparations including one or more dispersants based on an alkoxylated and carboxylic-esterified castor oil of the general formula I

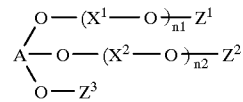

(I)

where A, $X^1$, $X^2$, $Z^1$, $Z^2$, $Z^3$, $n^1$ and $n^2$ are each as defined in Claim 1.

16 Claims, No Drawings

TEXTILE DYE PREPARATIONS

CROSS REFERENCE TO RELATED APPLICATION

This is a continuation of application Ser. No. 08/653,011, filed May 24, 1996, now abandoned.

The present invention relates to liquid or pulverent textile dye preparations including one or more dispersants based on an alkoxylated and carboxylic-esterified castor oil.

When textile fibre materials are dyed or printed using pulverulent or liquid textile dye preparations, all or almost all of the dye present therein in fine dispersion goes on to the fibre material. By contrast, the dispersants, present in the dye preparations as stabilizers therefor, end up in the waste water to a greater or lesser extent.

This contamination has to be expensively removed or at least reduced in waste water treatment plants. In addition, problems can arise due to the scarcity of landfill capacity for resulting sewage sludge.

Dispersed textile dyes in powder form typically include 100 to 150% by weight of dispersant, based on dye. Liquid textile dye preparations include about equal proportions of dispersant and dye as well as water.

Against this background, it has long been an objective to reduce the contamination of waste water associated with the application of textile dyes.

One approach to solving the problem is to use dispersants possessing improved biodegradability. In the course of biodegradation, the dispersants are wholly or partly degraded to carbon dioxide and water by bacteria present in the sewage sludge.

However, the ligninsulphonates chiefly used in industry at present, which are based on chemically modified renewable raw materials, are very slow to biodegrade. It is true that reducing the molecular weight of these compounds improves the degradability, but it also leads to distinctly worse dispersing capacity.

Similarly, the widely used synthetic dispersants prepared by condensation of naphthalenesulphonic acid and formaldehyde are only slightly biodegradable. Similarly, modified compounds of this type as described for example in EP-A-463 401 possess only minimal degradability and are merely eliminated from the waste water by adsorption on the sewage sludge, thereby increasing the mass or volume of the latter. Given the problems which can later arise with sewage sludge, this development too does not constitute a satisfactory solution.

EP-A-582 928 describes powerful biodegradable dispersants based on renewable raw materials. Use Example 11 of said reference describes the preparation and use of a liquid preparation of C.I. Disperse Orange 13. However, this preparation shows appreciable defects in its dispersion and storage stability. The lack of dispersion stability leads to unlevel dyeings when dyeing from an aqueous bath, to the appearance of specks in thermo-soft soling, or else to filtered-out deposits of dye when dyeing yarn on packages or fabric on the beam. The storage stability is poor because the preparation becomes inhomogeneous through reagglomeration of the dispersed particles when standing at room temperature or—to a distinctly greater extent—at elevated temperature and will then give rise to the abovementioned levelness or reproducibility problems in dyeing.

It has now been found that, surprisingly, the claimed dispersants based on alkoxylated and carboxylic-esterified castor oil meet all their technical and economic requirements.

The present invention accordingly provides liquid or pulverulent textile dye preparations, characterized in that they include one or more compounds of the general formula I

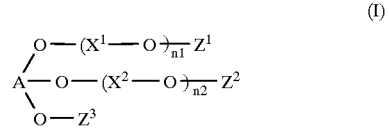

where
A is the radical of a natural or modified castor oil;
$X^1$ and $X^2$ are independently of each other ethylene or propylene;
$n^1$ is an integer from 1 to 150;
$n^2$ is an integer from 0 to 150;
$Z^1$ is $-CO(CH_2)_q COOM$, $-COCH=CHCOOM$, $-COCH_2CH(SO_3M)COOM$, $-COCH(SO_3M)CH_2COOM$ or $-COC_6H_4COOM$;
$Z^2$ has one of the meanings of $Z^1$ or is an acyl radical of a modified or unmodified natural resin acid, although one of $Z^1$ and $Z^2$ can also be hydrogen;
$Z^3$ is an acyl radical of a modified or unmodified natural resin acid, an acyl radical of a di- or tricarboxylic acid based on a di- or trimerized $C_{28}$–$C_{72}$ fatty acid or an acyl radical of a saturated or unsaturated $C_8$–$C_{22}$ fatty acid;
q is an integer from 0 to 10, and
M is hydrogen, an alkali metal or an alkaline earth metal.

Natural castor oil is to be understood as meaning commercial castor oil in particular.

Modified castor oil is to be understood as meaning a singly or multiply hydrogenated or a singly or multiply arylated castor oil, where arylated means that a phenolcarboxylic acid, preferably a hydroxynaphthoic acid or a derivative thereof, has been added to the olefinic double bond of castor oil.

$X^1$ and $X^2$ as propylene are each in particular $-CH(CH_3)CH_2-$ or $-CH_2CH(CH_3)-$. In a polyoxalkyl chain $-(X^1-O-)_{n1}-$, $X^1$ can also have different meanings. The same is true of $-(X^2-O-)_{n2}-$ and $X^2$.

$Z^2$ or $Z^3$ as acyl radicals of natural resin acids are derived in particular from abietic acid, dehydroabietic acid, dihydroabietic acid, tetrahydroabietic acid, laevopimaric acid, dextropimaric acid and isodextropimaric acid, as present in commercially available rosins. Modified resin acids are in particular disproportionated, hydrogenated and dimerized resin acids.

$Z^3$ acyl radicals of di- and tricarboxylic acids based on di- or trimerized fatty acid preferably have 36 to 54 carbon atoms.

$Z^3$ acyl radicals of saturated or unsaturated $C_8$–$C_{22}$ fatty acids are derived in particular from octanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachidic acid, behenic acid, 10-undecenoic acid, lauroleic acid, myristoleic acid, palmitoleic acid, 6c- and 6t-octadecenoic acid, elaidic acid, oleic acid, linoleic acid and linolenic acid, preference being given to even-numbered fatty acids or hydroxy fatty acids having in each case 8 to 20 carbon atoms, for example the corresponding aforementioned even-numbered fatty acids and also in particular their mixtures obtained from natural products, such as tall oil fatty acid, tallow fatty acid, coconut oil fatty acid, palm kernel oil fatty acid and linseed oil fatty acid.

It is particularly preferred for the acyl radicals mentioned to derive from fatty acids having 12 to 18 carbon atoms.

An alkali or alkaline earth metal M is in particular sodium, potassium, magnesium or calcium.

Preferred textile dye preparations according to this invention include one or more compounds of the general formula I where $X^1$ and $X^2$ are independently of each other ethylene or propylene or, within a radical —$(X^1$—O—$)_{n^1}$—, $X^1$ is ethylene or propylene in a ratio of 100:1 to 10:100 and/or, within a radical —$(X^2$—O—$)_{n^2}$, $X^2$ is ethylene and propylene in a ratio of 100:1 to 10:100;

$n^1$ is an integer from 20 to 100;

$n^2$ is an integer from 20 to 100 or is 0 when $Z^2$ is an acyl radical of a modified or unmodified natural resin acid;

$Z^1$ is —$CO(CH_2)_2COOM$, —$COCH=CHOOM$, —$COCH_2CH(SO_3M)COOM$ or —$COCH(SO_3M)CH_2COOM$;

$Z^2$ has one of the meanings of $Z^1$ or, when $n^2$ is 0, is the acyl radical of a modified or unmodified natural resin acid, although one of $Z^1$ and $Z^2$ can also be hydrogen;

$Z^3$ is an acyl radical of a modified or unmodified natural resin acid; and

M is hydrogen or an alkali metal.

Particularly preferred textile dye preparations according to this invention include one or more compounds of the general formula I where $X^1$ and $X^2$ are each ethylene;

$n^1$ and $n^2$ are together an integer from 60 to 150;

$Z^1$ and $Z^2$ are identical and are each —$CO(CH_2)_2COOM$, —$COCH_2CH(SO_3M)COOM$ or —$COCH(SO_3M)CH_2COOM$;

$Z^3$ is an acyl radical of a modified or unmodified resin acid, and

M is sodium.

The textile dyes present in the textile dye preparations according to this invention are sparingly soluble or insoluble in water.

Such dyes are for example disperse dyes, such as azo, anthraquinone, methine, quinophthalone, naphthalimide, naphthoquinone or nitro dyes, as described for example in Ullmann's Encyklopädie der technischen Chemie, 4th edition, Vol. 10, pages 155 et seq.

However, they can also be vat dyes, in particular anthraquinone derivatives, derivatives of indigo and higher fused and heterocyclic benzo- and naphthoquinones, as described for example in Ullmann's Encyklopädie der technischen Chemie, 4th edition, Vol. 22, pages 645 et seq.

Finally, they can also be sparingly water-soluble or water-insoluble sulphur dyes, as described for example in Ullmann's Encyklopädie der technischen Chemie, 4th edition, Vol. 21, pages 265 et seq.

The textile dye preparations according to this invention may also include a plurality of dyes which may belong to the same class of dye or else to different classes of dye. For instance, mixtures of disperse and vat dyes may be included. Preferred textile dye preparations are those which include vat dyes. Particularly preferred textile dye preparations include disperse dyes.

The liquid textile dye preparations according to this invention preferably include dye quantities of 20 to 50% by weight, particularly preferably 25 to 45% by weight. The dye content of pulverulent preparations is preferably 30 to 70% by weight, particularly preferably 35 to 60% by weight.

The proportion of compounds of the general formula I is preferably 10 to 50% by weight, particularly preferably 15 to 30% by weight, in each case based on the textile dye quantity.

The textile dye preparations according to this invention can be prepared for example by grinding one or more textile dyes in the presence of one or more compounds of the general formula I and water in suitable mills and, if a pulverulent preparation is to be prepared, subsequently removing the liquid.

Suitable mills include for example ball, vibratory, bead or sand mills. Therein the textile dye, preferably in the form of an aqueous dye presscake, is ground in the presence of compounds of the general formula I to a particle size of 0.5 to 5 $\mu$m. Preference is given to a particle size distribution where 50 to 90% of the particles have a size of <1 $\mu$m.

It may be advantageous in certain circumstances for dye, compound of the general formula I and water to be premixed in a stirred kettle or beater trough or to be precomminuted in a colloid mill.

The grinding process can be carried out continuously in a mill cascade or else batchwise in a grinding machine. The grinding process is preferably carried out at 0 to 100° C., particularly preferably at 20 to 60° C.

If a pulverulent preparation is to be prepared, the liquid has to be removed from the liquid preparation thus obtained. This can be done by vacuum drying, freeze drying, by drying on drum dryers, but preferably by spray drying. Suitable spray drying machines include vacuum paddle dryers or preferably atomization dryers. Herein the mill base can be atomized using two-material nozzles, pressure nozzles or discs. The air inlet temperature is preferably within the range from 120 to 220° C., the outlet temperature is preferably 70 to 90° C.

In certain circumstances it can be advantageous, for the purpose of improving the dispersion stability and in particular the storage stability and the redispersibility of the liquid and pulverulent preparations, to include in the textile dye preparations according to this invention further non-ionic or preferably anionic dispersants.

Anionic dispersants include for example condensation products of aromatic sulphonic acids and formaldehyde, in particular condensation products of alkylnaphthalenesulphonic acids and formaldehyde, condensation products of optionally substituted phenol with formaldehyde and sodium bisulphite, alkali metal salts of condensation products of optionally substituted phenol, naphthalene- or naphtholsulphonic acids, formaldehyde and sodium bisulphite, alkali metal salts of condensation products of optionally substituted phenolsulphonic acids, formaldehyde and urea, alkyl- and alkylaryl-sulphonates, alkylaryl polyglycol ether sulphates and in particular neutralized acid esters of an ethoxylated novolak or alkali metal salts of ligninsulphonates.

Non-ionic dispersants or emulsifiers include for example reaction products of alkylene oxides, such as, for example, ethylene oxide or propylene oxide, with alkylatable compounds, such as, for example, fatty alcohols, fatty amines, fatty acids, phenols, alkylphenols, arylalkylphenols, arylalkylarylphenols and carboxamides, such as, for example, addition products of 5 to 10 ethylene oxide units with $C_8$–$C_{10}$-alkylphenols.

The proportion of these dispersants, based on the proportion of textile dye in the preparation, is preferably 2 to 35% by weight, particularly preferably 5 to 30% by weight.

The pulverulent textile dye preparations according to this invention may additionally include substances such as sorbitol or dextrins as fillers. These fillers have no dispersing effect and merely function to suppress the clumping together of the powder in spray drying, as might arise to a very pronounced extent with compounds of the general formula I.

The textile dye preparations according to this invention may additionally include further auxiliaries, for example those which act as oxidizing agents, such as, for example, sodium m-nitrobenzenesulphonate, or fungicides, such as, for example, sodium o-phenolphenolate. Dye mixtures finished as powders additionally include other auxiliaries, such as, for example, wetting or dustproofing agents. The dye preparations include the aforementioned auxiliaries in amounts of 0.1–5% by weight, preferably 0.2–2% by weight.

The compounds of the general formula I required for preparing the textile dye preparations according to this invention are known per se and can be obtained for example by the processes indicated in EP-A-582 928.

Those textile dye preparations according to this invention which include disperse dye are highly suitable for dyeing and printing textile polyester fibre materials, polyamides, cellulose acetate, cellulose triacetate and blends thereof with natural fibre materials, such as cotton, regenerated cellulose or wool. Polyester fibre materials in this context are in particular those based on high molecular weight polyethylene glycol terephthalates.

Those textile dye preparations according to this invention which include vat or sulphur dyes are highly suitable for dyeing natural fibre materials. Examples of natural fibre materials are cellulose fibre materials, in particular cotton, but also wool. Similarly, blends of these materials with synthetic fibre materials can be dyed in this way.

Details concerning the dyeing processes may be found for example in Ullmann's Encyklopädie der technischen Chemie, 4th edition, Vol. 22, in particular pages 644 et seq.

The textile dye preparations according to this invention meet their technical and economic requirements superbly. First, the compounds of the general formula I are based predominantly on renewable raw materials. Secondly, they have excellent dispersing capacity, so that the quantities used can be distinctly reduced compared with conventional dispersants. And, thirdly, they are very readily biodegradable. This applies not only to the compounds of the general formula I themselves but in particular also to the dyehouse waste waters obtained from their use.

In addition, the textile dye preparations according to this invention meet all technical requirements; that is, they are preparable in a conventional manner and have the high dispersion stability required for use in modern dyeing and printing plant.

Textile yarn or fabric in high packing density is dyed homogeneously and without dye deposits even at high dye concentration and high liquor throughputs, i.e. high shearing forces. The textile dye preparations according to this invention are readily and homogeneously grindable and do not reagglomerate, so that they will produce speck-free thermosolings and prints. The liquid preparations are storage-stable for several months even at elevated storage temperature; that is, their homogeneity does not change, there is no reagglomeration or phase separation, nor sedimentation or any change in viscosity. Dispersion dried to container walls is readily redispersible by stirring into the liquid preparation.

The powder preparations according to this invention are spray-dryable under the customary conditions. They are likewise storage-stable and are readily wettable, or disperse on brief stirring, if they are to be converted into an aqueous dyeing liquor.

The biodegradability of the compounds of the general formula I can be determined for example by the Zahn-Wellens test (R. Zahn, H. Wellens, Chem. Zeitung, Vol. 90, 228 (1974)) or the DOC-Die Away test.

In the Zahn-Wellens test, the in-test substance, a defined water of dilution and municipal activated sludge are stirred and aerated in a static set-up under standardized conditions for up to 28 days. Samples are taken at regular intervals and analyzed in respect of DOC (dissolved organic carbon) decrease in accordance with DIN 38409 Part 3 (1983). Compared with the starting value, the decrease in DOC is taken as a measure of the complete elimination from the water. Biological degradation processes, adsorption on the activated sludge or stripping effects can be distinguished, depending on the shape of the elimination curve. Criteria for biological degradation are the presence of a typical S-shaped degradation curve, a low adsorption percentage (elimination after 3 h <20%) and the absence of evidence for stripping effects. An in-test substance may be termed biodegradable only if this is absolutely clear from the test results or from additional information.

The testing of the decrease in dissolved organic carbon under test conditions can also be effected by measuring the chemical oxygen demand (COD) of the batch in accordance with DIN 38409 Part 4 at intervals.

In the DOC Die Away test, the test batch additionally includes a defined inorganic nutrient salt medium.

The biodegradability test can be carried out not only with the compounds of the general formula I themselves but also with the dyehouse waste water from the dyeings of the textile dye preparations formulated therewith. Since the compounds of the general formula I are at least partially hydrolyzed in the course of the dyeing process and the hydrolysis products are more degradable, the dyehouse waste waters give higher degradation rates.

EXAMPLE 1 a) 16.9 g of a water-containing filtercake of the dye C.I. Disperse Blue 165 which contains 13.5 g of pure dye and 17.6 g of a water-containing filtercake of dye C.I. Disperse Blue 366 which contains 15.0 g of pure dye are sand-milled with 7.1 g of an 80% strength aqueous solution which contains 5.7 g of the compound of the general formula I where A is the radical of castor oil, $X^1$ and $X^2$ are each ethylene, the sum of $n^1$ and $n^2$ is about 80, $Z^1$ and $Z^2$ are each the acyl radical of the disodium salt of sulphosuccinic acid and $Z^3$ is the acyl radical of dehydroabietic acid, 4.3 g of a ligninsulphonate and 54.1 g of water until about 80% of the dye particles have a particle size of <1 μm. The liquid dispersion thus obtained is separated from the sand using a sieve.

b) 1.25 g of the liquid preparation thus obtained are dispersed in 2000 g of water. The dispersion is admixed with 4 g of ammonium sulphate, 2 g of commercially available dispersant based on a condensation product of sodium naphthalenesulphonate and formaldehyde and 2 g of a condensation product of m-cresol, formaldehyde and sodium sulphite and adjusted with acetic acid at pH 5.5. The dyeing liquor thus obtained is entered with 100 g of a textured polyester fabric based on polyethylene glycol terephthalate and dyeing continues at 125° C. for half an hour. After subsequent rinsing, reduction clearing with 0.2% strength sodium dithionite solution for 15 min at 70 to 80° C., rinsing and drying leaves a strong blue dyeing having excellent coloristic properties.

c) 1 g of this liquid preparation is stirred into 250 ml of water and admixed, by stirring, with 0.4 g of a commercially available dispersant based on a condensation product of m-cresol, formaldehyde and sodium sulphite, 0.8 g of a commercially available carrier based on methylnaphthalene, 0.8 g of crystalline sodium acetate and also 1.2 ml of 30% strength acetic acid and made up with water to 400 ml. The pH of the dyebath is 4.5. This dyebath is entered with 10 g of a polyester fabric based on polyethylene glycol terephthalate. After dyeing at 95° C. in an open vessel for 90 min, the dyed material is removed, rinsed, reduction cleared with alkaline 0.2% strength sodium dithionite solution (15 min at 60 to 70° C.), rinsed again and dried. The dyeing obtained has a strong blue colour and excellent coloristic properties.

EXAMPLE 2 a) 93.5 g of a water-containing filtercake of the dye C.I. Disperse Yellow 114 which contains 37.4 g of pure dye are ball-milled with 5.7 g of a compound of the general formula I where A is the radical of castor oil, $X^1$ and $X^2$ are each ethylene, the sum of $n^1$ and $n^2$ is about 100, $Z^1$ and $Z^2$ are each the acyl radical of sodium maleate and $Z^3$ is the acyl radical of dehydroabietic acid, 3.6 g of a ligninsulphonate and 0.3 g of a fungicide based on benzimidazole until 75% of the dye particles have a particle size of <1 μm. The dispersion thus obtained is separated from the grinding media by filtration.

b) 20 g of the liquid preparation thus obtained are stirred together with 15 g of commercially available antimigrant and 2 g of monosodium phosphate into a padding liquor in such a way that the final volume thereof is 1 liter. This padding liquor is then used to impregnate, at 25° C., a 65:35 polyester-cotton blend fabric, which is then squeezed off to a wet pick-up of about 65%, predried in an infrared dryer for 30 sec and dried at 110° C. for 60 sec, and the disperse dye is fixed in the polyester fibre in the course of 60 sec at 210° C. The result obtained is a fabric whose polyester portion has been dyed yellow. The cotton portion can subsequently be dyed for example with a reactive or vat dye of equal hue.

EXAMPLE 3 a) 150 g of a water-containing filtercake of the dye C.I. Disperse Yellow 114 which contains 60 g of pure dye, 25 g of the compound of the general formula I from Example 1a in 80% strength form and 20 g of a ligninsulphonate are homogenized using a sawtooth stirrer. The resulting suspension is adjusted with 50% strength acetic acid to pH 8 and then bead-milled at room temperature for 2 h, sieved and spray-dried in a spray dryer using an air inlet temperature of 140° C. and an outlet temperature of 75° C.

b) Example 1b is repeated with the 1.25 g of the liquid preparation of Example 1b replaced by 0.6 g of the powder preparation of Example 3a, affording a strong yellow dyeing.

EXAMPLE 4 a) 400 g of water-containing filtercake of the dye C.I. Vat Red 1 which contains 100 g of pure dye are converted by the method of Example 3a into a pulverulent preparation using 10 g of a compound of the general formula I where A is the radical of castor oil, $X^1$ and $X^2$ are each a mixture of 90 parts by weight of ethylene and 10 parts by weight of propylene, the sum of $n^1$ and $n^2$ is about 120, $Z^1$ and $Z^2$ are each a random mixture of the acyl radicals of sodium sulphosuccinate and sodium maleate in a weight ratio of 1:1 and $Z^3$ is the acyl radical of a modified natural resin acid, 30 g of a sodium ligninsulphonate and 0.5 g of commercially available dustproofing agent based on an emulsified mineral oil.

b) 0.3 g of the dye powder thus obtained is stirred into 40 ml of hot water, admixed with 16 ml of a 33% strength aqueous sodium hydroxide solution and 8 ml of a 10% strength aqueous hydrosulphite solution and diluted with 125 ml of water. This dyeing liquor is entered with 10 g of a cotton fabric, heated to 70° C., held at 70° C. for 15 min, cooled down to 30° C., and the fabric is removed and rinsed with water. The vatted dye on the fibre is subsequently reexidized by heating the resulting cotton fabric for 10 min at 60° C. in 200 ml of water admixed with 1 ml of 35% strength hydrogen peroxide solution and 0.2 g of sodium carbonate. Rinsing with water, soaping, renewed rinsing and drying leaves a cotton fabric which has been dyed a brilliant pink colour.

EXAMPLE 5

100 g of a water-containing filtercake of the dye C.I. Sulphur Blue 13 which contains 30 g of pure dye are converted into a liquid dispersion together with 2 g of the compound of the general formula I of Example 2a as described in Example 2a. Cotton can be dyed with this liquid sulphur dye preparation in a conventional manner.

We claim:

1. A disperse dye preparation, comprising:

a disperse dyestuff, and a dyestuff-dispersing amount of at least one compound of the general formula I

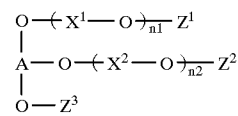

(I)

where

A is the radical of a natural or modified castor oil;

$X^1$ and $X^2$ are independently of each other ethylene or propylene;

$n^1$ is an integer from 1 to 150;

$n^2$ is an integer from 0 to 150;

$Z^1$ is —CO(CH$_2$)$_q$COOM, —COCH=CHCOOM, —COCH$_2$CH(SO$_3$M)COOM, —COCH(SO$_3$M)CH$_2$COOM or —COC$_6$H$_4$COOM;

$Z^2$ has one of the meanings of $Z^1$ or is an acyl radical of a modified or unmodified natural resin acid, although one of $Z^1$ and $Z^2$ can also be hydrogen;

$Z^3$ is an acyl radical of a modified or unmodified natural resin acid, an acyl radical of a di- or tricarboxylic acid based on a di- or trimerized $C_{28}$–$C_{72}$ fatty acid or an acyl radical of a saturated or unsaturated $C_8$–$C_{22}$ fatty acid;

q is an integer from 0 to 10, and

M is hydrogen, an alkali metal or an alkaline earth metal.

2. Disperse dye preparation according to claim 1, wherein, in the general formula I, $X^1$ and $X^2$ are independently of each other ethylene or propylene and, within a radical —(X$^1$—O—)$_{n1}$—, $X^1$ or $X^2$ is ethylene and propylene in an ethylene:propylene or propylene:ethylene ratio of 100:1 to 10:100;

$n^1$ is an integer from 20 to 100;

$n^2$ is an integer from 20 to 100 or is 0 when $Z^2$ is an acyl radical of a modified or unmodified natural resin acid;

$Z^1$ is —CO(CH$_2$)$_2$COOM, —COCH=CHOOM, —COCH$_2$CH(SO$_3$M)COOM or —COCH(SO$_3$M)CH$_2$COOM;

$Z^2$ has one of the meanings of $Z^1$ or, when $n^2$ is 0, is the acyl radical of a modified or unmodified natural resin acid, or one of $Z^1$ and $Z^2$ can also be hydrogen;

$Z^3$ is an acyl radical of a modified or unmodified natural resin acid; and

M is hydrogen or an alkali metal.

3. Disperse dye preparation according to claim 1, wherein, in the general formula I, $X^1$ and $X^2$ are each ethylene;

$n^1$ and $n^2$ are together an integer from 60 to 150;

$Z^1$ and $Z^2$ are identical and are each —CO(CH$_2$)$_2$COOM, —COCH$_2$CH(SO$_3$M)COOM or —COCH(SO$_3$M)CH$_2$COOM;

$Z^3$ is an acyl radical of a modified or unmodified resin acid, and

M is sodium.

4. Disperse dye preparation according to claim 1, comprising a liquid composition including 20 to 50% by weight of dye.

5. Disperse dye preparation according to claim 1, comprising 30 to 70% by weight of dye.

6. Disperse dye preparation according to claim 1, wherein the amount of compound of the general formula I is 10 to 50% by weight, based on the amount of said dyestuff.

7. Disperse dye preparation according to claim 1, wherein said dyestuff is an azo, anthraquinone, methine, quinophthalone, naphthalimide, naphthoquinone or nitro dye.

8. Process for preparing a disperse dye preparation according to claim 1, comprising:

grinding a disperse dye in a mill in the presence of one or more compounds of the general formula I and an aqueous medium.

9. A process as claimed in claim 8, wherein, subsequent to grinding, the aqueous medium is removed, and a a disperse dye preparation is obtained.

10. A method of dispersing a dyestuff, comprising the step of dispersing a disperse dyestuff with aid of dyestuff-dispersing amount of a biodegradable compound of the general formula I:

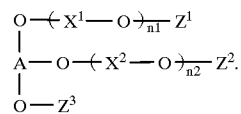

where

A is the radical of a natural or modified castor oil;

$X^1$ and $X^2$ are independently of each other ethylene or propylene;

$n^1$ is an integer from 1 to 150;

$n^2$ is an integer from 0 to 150;

$Z^1$ is —CO(CH$_2$)$_q$COOM, —COCH=CHCOOM, —COCH$_2$CH(SO$_3$M)COOM, —COCH(SO$_3$M)CH$_2$COOM or —COC$_6$H$_4$COOM;

$Z^2$ has one of the meanings of $Z^1$ or is an acyl radical of a modified or unmodified natural resin acid, although one of $Z^1$ and $Z^2$ can also be hydrogen;

$Z^3$ is an acyl radical of a modified or unmodified natural resin acid, an acyl radical of a di- or tricarboxylic acid based on a di- or trimerized $C_{28}$–$C_{72}$ fatty acid or an acyl radical of a saturated or unsaturated $C_8$–$C_{22}$ fatty acid;

q is an integer from 0 to 10, and

M is hydrogen, an alkali metal or an alkaline earth metal.

11. A method for dyeing or printing a textile fiber material comprising the step of dyeing or printing said material with a disperse dye preparation as claimed in claim 1.

12. The method as claimed in claim 11, wherein said fiber material comprises a synthetic fiber.

13. The method as claimed in claim 12, wherein said synthetic fiber is a polyamide, a cellulose acetate, or a cellulose triacetate.

14. The method as claimed in claim 13, wherein said synthetic fiber is blended with a natural fiber material.

15. The method as claimed in claim 14, wherein said natural fiber material is cotton, regenerated cellulose or wool.

16. A method for dyeing a textile fiber material comprising the step of dyeing said material with a disperse dye preparation as claimed in claim 1.

* * * * *